United States Patent
Hong et al.

(10) Patent No.: US 10,778,590 B2
(45) Date of Patent: Sep. 15, 2020

(54) METHOD, APPARATUS, AND SYSTEM FOR DATA TRANSMISSION

(71) Applicant: Beijing Xiaomi Mobile Software Co., Ltd., Beijing (CN)

(72) Inventors: Wei Hong, Beijing (CN); Juejia Zhou, Beijing (CN); Ming Zhang, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 48 days.

(21) Appl. No.: 16/229,311

(22) Filed: Dec. 21, 2018

(65) Prior Publication Data

US 2019/0124012 A1   Apr. 25, 2019

Related U.S. Application Data

(63) Continuation of application No. PCT/CN2016/087578, filed on Jun. 29, 2016.

(51) Int. Cl.
*H04L 29/06* (2006.01)
*H04L 12/751* (2013.01)
(Continued)

(52) U.S. Cl.
CPC .............. *H04L 47/24* (2013.01); *G06F 16/24* (2019.01); *H04L 45/02* (2013.01); *H04W 72/08* (2013.01);
(Continued)

(58) Field of Classification Search
CPC ..... H04L 47/24; H04L 45/02; H04L 41/5003; H04W 72/087; H04W 72/08; G06F 16/24
See application file for complete search history.

(56) References Cited

U.S. PATENT DOCUMENTS 9,264,950 B2 * 2/2016 Perssson ............ H04W 36/0055
2007/0155365 A1   7/2007 Kim et al.
(Continued)

FOREIGN PATENT DOCUMENTS

CN   105165095 A   12/2015
CN   105379351 A   3/2016
(Continued)

OTHER PUBLICATIONS

International Search Report of PCT Application No. PCT/CN2016/087578, dated Mar. 30, 2017, issued by the ISA/CN—State Intellectual Property Office of the P.R. China.

*Primary Examiner* — Diane L Lo
*Assistant Examiner* — Abusayeed M Haque
(74) *Attorney, Agent, or Firm* — Finnegan, Henderson, Farabow, Garrett & Dunner, L.L.P.

(57) ABSTRACT

The present disclosure provides a method, apparatus, and system for data transmission, which pertains to the technical field of communication. The method includes: receiving by a terminal a Quality of Service (QOS) class mapping table sent from a network access device, the QOS class mapping table including a corresponding relationship between a Quality of service Class Identifier (QCI) and an Access Category (AC); receiving by the terminal the QCI configured by the network access device for a radio bearer, wherein the radio hearer is configured to transmit first uplink data; querying by the terminal the AC corresponding to the QCI, based on QOS class mapping table; sending by the terminal second uplink data to the network access device using the AC via a Wireless Local Area Network (WLAN) link; wherein the first uplink data and the second uplink data are data transmitted in aggregation transmission.

18 Claims, 6 Drawing Sheets

(51) Int. Cl.
 *H04L 5/14* (2006.01)
 *H04L 12/433* (2006.01)
 *H04L 12/851* (2013.01)
 *H04W 72/08* (2009.01)
 *G06F 16/24* (2019.01)
 *H04W 28/24* (2009.01)
 *H04W 84/12* (2009.01)

(52) U.S. Cl.
 CPC .......... *H04W 72/087* (2013.01); *H04W 28/24* (2013.01); *H04W 84/12* (2013.01)

(56) References Cited

U.S. PATENT DOCUMENTS

| | | | |
|---|---|---|---|
| 2013/0329559 A1* | 12/2013 | Cabrera | H04L 47/245 370/235 |
| 2015/0043486 A1 | 2/2015 | Ozturk et al. | |
| 2015/0334601 A1* | 11/2015 | Gao | H04W 28/18 370/329 |
| 2016/0073299 A1* | 3/2016 | Liang | H04M 15/66 370/331 |
| 2016/0112742 A1* | 4/2016 | Skarp | H04N 21/26241 725/62 |
| 2016/0212755 A1* | 7/2016 | Cao | H04W 40/12 |

FOREIGN PATENT DOCUMENTS

| | | |
|---|---|---|
| CN | 105453640 A | 3/2016 |
| JP | 2015012591 A | 1/2015 |
| WO | WO 2015/002767 A1 | 1/2015 |

\* cited by examiner

METHOD, APPARATUS, AND SYSTEM FOR DATA TRANSMISSION

CROSS-REFERENCE TO RELATED APPLICATIONS

This application is a continuation of International Application No. PCT/CN2016/087578, filed Jun. 29, 2016, the entire contents of which are incorporated herein by reference.

TECHNICAL FIELD

The present disclosure generally relates to the technical field of communication, and more particularly, to a method, apparatus, and system for data transmission.

BACKGROUND

LTE-WLAN Aggregations (LWA) is a technology using a Long Term Evolution (LTE) network and Wireless Local Area Networks (WLAN) to perform data transmission.

Limited by time factor, the 3rd Generation Partnership Project (3GPP) now only discusses downlink data transmission of the LWA. The downlink data transmission procedure may include: when an evolved Node B (eNB) performs downlink data transmission using LWA, the eNB transmitting a portion of downlink data to User Equipment (UE) via an LTE link, and meanwhile transmitting remaining data of the downlink data to the UE via a WLAN link according to a Medium Access Control (MAC) address of the UE; and then the UE performing an aggregation on the two parts of data so as to complete the downlink data transmission.

However, there is no complete solution for uplink data transmission of the LWA. In the uplink data transmission of the LWA, how to guarantee the Quality of Service (QOS) is a difficult problem.

SUMMARY

According to a first aspect of the present disclosure, a method for data transmission is provided. The method may include: receiving by a terminal a Quality of Service (QOS) class mapping table sent from a network access device, the QOS class mapping table including a corresponding relationship between a Quality of service Class Identifier (QCI) and an Access Category (AC); receiving by the terminal the QCI configured by the network access device for a radio bearer, wherein the radio bearer is established between the terminal and the network access device and is configured to transmit first uplink data; querying by the terminal the AC corresponding to the QCI, based on the QOS class mapping table; and sending by the terminal second uplink data to the network access device using the AC via a Wireless Local Area Network (WLAN) link, wherein the first uplink data and the second uplink data are data transmitted in aggregation transmission.

According to a second aspect of the present disclosure, a method for data transmission is provided. The method may include: sending by a network access device a Quality of Service (QOS) class mapping table to a terminal, the QOS class mapping table including a corresponding relationship between a Quality of service Class Identifier (QCI) and an Access Category (AC); configuring by the network access device the QCI for a radio bearer corresponding to the terminal, wherein the radio bearer is established between the terminal and the network access device and is configured to transmit first uplink data; and receiving by the network access device second uplink data sent from the terminal via a Wireless Local Area Network (WLAN) link, wherein the AC corresponding to the second uplink data is the AC corresponding to the QCI in the QOS class mapping table, wherein the first uplink data and the second uplink data are data transmitted in aggregation transmission.

According to a third aspect of the present disclosure, an apparatus for data transmission is provided. The apparatus may include: a receiver configured to receive a Quality of Service (QOS) class mapping table sent from a network access device, the QOS class mapping table including a corresponding relationship between a Quality of service Class Identifier (QCI) and an Access Category (AC); the receiver further configured to receive the QCI configured by the network access device for a radio hearer, wherein the radio bearer is established between the terminal and the network access device and is configured to transmit first uplink data; a processor configured to query the AC corresponding to the QCI, based on the QOS class mapping table; and a transmitter configured to send second uplink data to the network access device using the AC via a Wireless Local Area Network (WLAN) link, wherein the first uplink data and the second uplink data are data transmitted in aggregation transmission.

According to a fourth aspect of the present disclosure, an apparatus for data transmission is provided. The apparatus may include: a transmitter configured to send a Quality of Service (QOS) class mapping table to a terminal, the QOS class mapping table including a corresponding relationship between a Quality of service Class Identifier (QCI) and an Access Category (AC); the transmitter further configured to configure the QCI for a radio bearer corresponding to the terminal, wherein the radio bearer is established between the terminal and the network access device and is configured to transmit first uplink data; a receiver configured to receive second uplink data sent by the terminal via a Wireless Local Area Network (WLAN) link, wherein the AC corresponding to the second uplink data is the AC corresponding to the QCI in the QOS class mapping table, and wherein the first uplink data and the second uplink data are data transmitted in aggregation transmission.

The technical solutions provided by the embodiments of the present disclosure may solve the problem of how to improve the QOS in the uplink data transmission of the LWA. Accordingly, the terminal is enabled to perform uplink data transmission with same or similar QOS in the mobile communication link and the WLAN link, such that both the QOS of these two links can be guaranteed.

It is to be understood that the forgoing general description and the following detailed description are illustrative only, and are not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Figure 1:
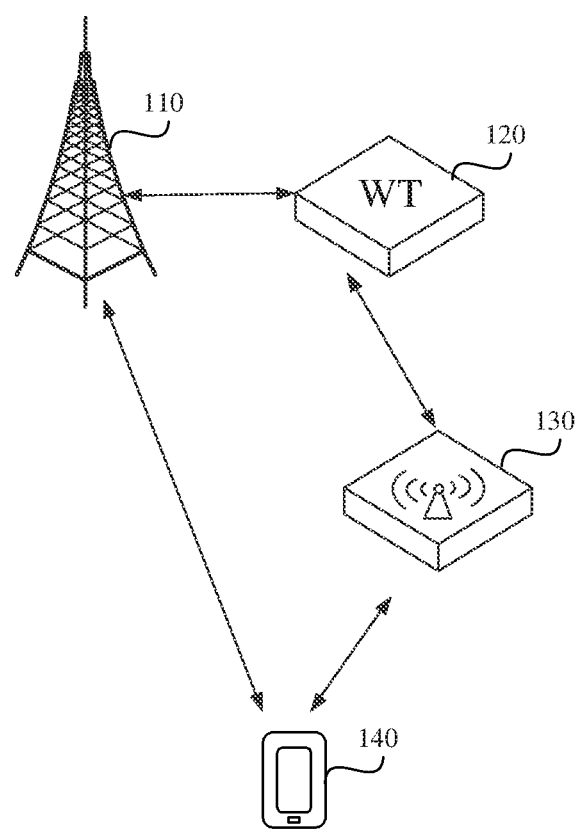
FIG. 1 is a schematic diagram illustrating a system for data transmission according to an exemplary embodiment.

Reference will now be made in detail to example embodiments, examples of which are illustrated in the accompanying drawings. The following description refers to the accompanying drawings in which same numbers in different drawings represent same or similar elements unless otherwise described. The implementations set forth in the following description of example embodiments do not represent all implementations consistent with the present disclosure. Instead, they are merely examples of devices and methods consistent with aspects related to the present disclosure as recited in the appended claims.

The "module(s)" mentioned herein may be programs or instructions stored in a memory and capable of implementing certain functions. The "module(s)" may also be functional structures that are logically divided, and the functional structures may be implemented by hardware or a combination of hardware and software.

In the present disclosure, a network access device may be a network element providing a mobile communication network access function in a mobile communication system.

In different mobile communication systems, the network access device may have same or similar functions, but may have different names or implementations. For example, the network access device may be a Base Transceiver Station (BTS) in the Global System for Mobile communication (GSM) or the Code Division Multiple Access (CDMA). Also for example, the network access device may be a NodeB in the Universal Mobile Telecommunications System (UMTS). As another example, the network access device may be an evolved Node B (eNB or e-NodeB) in the Long Term Evolution (LTE). In an actual network, the network access device may be specifically implemented as a macro eNB, a micro eNB, a femto eNB, a repeater and the like.

In the present disclosure, a terminal may be an electronic device used by a user in the mobile communication system.

In different mobile communication systems, the terminal may have same or similar functions, but may have different names or implementations. For example, the terminal may be a Subscriber Unit, a Subscriber Station, a Mobile Station, a Mobile, a Remote Station, an Access Point, a Remote Terminal, an Access Terminal, a User Terminal, a User Agent, a User Device, or a User Equipment (UE). In the actual network, the terminal may be specifically implemented as a mobile phone, a tablet, a smart appliance, a smart instrument, a device of Internet of Things, a device of Internet of Vehicles and the like. The embodiments of the present disclosure do not limit the specific number and the specific location of the terminal.

In the present disclosure, a WLAN Termination (WT) is a logic network element defined A system, which may manage a WLAN Access Point (AP).

In an LWA system, one WT may only have a connection with one of the eNBs, and these two elements are usually arranged together. One WT may connect to a plurality of WLAN APs, and may monitor and manage each WLAN AP connected to the WT. In the LWA system, when the network access device transmits downlink data packet to the terminal via the WLAN link or receives uplink data packet transmitted by the terminal via the WLAN link, the downlink data packet and the uplink data packet may pass through the WT connected to the network access device.

In the present disclosure, an AP may he a node providing WLAN access function(s) to the terminal in the WLAN.

FIG. 1 is a schematic diagram illustrating a system for data transmission according to an exemplary embodiment of the present disclosure. The system for data transmission may include: a network access device 110, a WT 120, a WLAN AP 130, and a terminal 140.

In exemplary embodiments, the network access device 110 may be an eNB in the LTE. The network access device 110 may send downlink data via an LTE link and a WLAN link, and the network access device 110 may receive uplink data via the LTE link and the WLAN link. Suppose that the data transmitted via the LTE link includes first downlink data and first uplink data, and the data transmitted via the WLAN link includes second downlink data and second downlink data, then the network access device 110 may be able to encapsulate data from a core network into the first downlink data and the second downlink data, and may send the first downlink data to the terminal via the LTE link and may send the second downlink data to the terminal via the WLAN link. The network access device 110 also may receive the first uplink data via the LTE link and may receive the second uplink data via the WLAN link. The network access device 110 may perform aggregation on the first uplink data and the second uplink data, and then send the aggregated uplink data to the core network.

The network access device 110 may connect to the WT 120 in a one-to-one relationship, and generally the network access device 110 may be arranged together with the WT 120 (e.g., formed on a same main hoard). The network access device 110 may also connect to the WT 120 via an optical fiber. As shown in FIG. 1, the network access device 110 may connect to the WT 120.

The WT 120 may send the second downlink data and may receive the second uplink data. The WT 120 may connect to a plurality of WLAN APs 130 at the same time, and may receive the second uplink data sent from each WLAN AP 130 or may transmit the second downlink data to the connected WLAN APs 130. The embodiments of the present disclosure do not limit the number of the WLAN APs 130 connected to the WT 120.

The WLAN AP 130 may send the second downlink data and may receive the second uplink data. In the actual network. The WLAN AP 130 may be an electronic device such as a wireless router and a wireless gateway. The WLAN AP 130 may connect to a plurality of WTs 120.

The terminal 140 may send the first uplink data and the second uplink data, and may receive the first downlink data and the second downlink data. Additionally, the terminal 140 may have an LWA function. For example, when the received downlink data includes the first downlink data and the second downlink data, the terminal 140 may be able to perform aggregation on the first downlink data and the second downlink data. The terminal 140 also may divide the uplink data into the first uplink data and the second uplink data. The terminal 140 may send the first uplink data to the network access device 110 via the LTE link, and may send the second uplink data to the network access device 110 via the WLAN link. The embodiments of the present disclosure may not limit the specific number and the specific location of the terminals 140.

Figure 2:
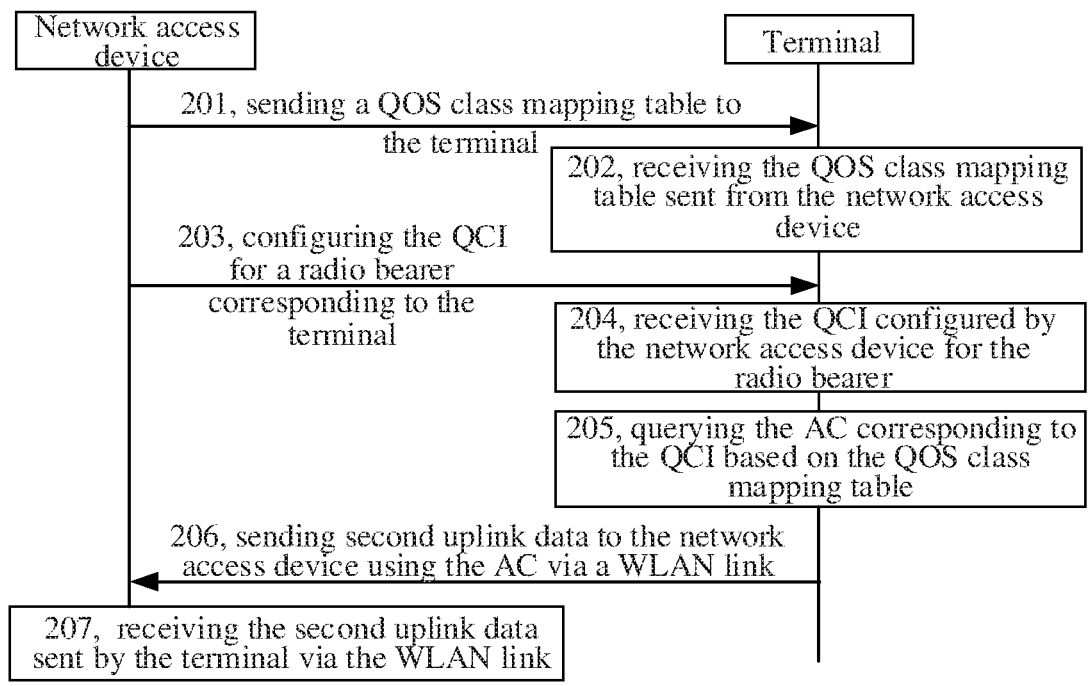
FIG. 2 is a flow diagram illustrating a method for data transmission according to an exemplary embodiment.

FIG. 2 is a flow diagram illustrating a method for data transmission according to an exemplary embodiment. In this embodiment, the method for data transmission is illustrated by example as applied in the system for data transmission shown in FIG. 1. The method may include the following steps.

In step 201, a network access device may send a Quality of Service (QOS) class mapping table to a terminal. The QOS class mapping table may include a corresponding relationship between a Quality of service Class Identifier (QCI) and an Access Category (AC). The QCI may be a parameter representing the QOS class in a mobile communication system. For example, the mobile communication system may be an LIE system. The AC may be a parameter representing the QOS class in a WLAN system.

In step 202, the terminal may receive the QOS class mapping table sent from the network access device.

In step 203, the network access device may configure the QCI for a radio bearer corresponding to the terminal. The radio hearer may be established between the terminal and the network access device and may be configured to transmit first uplink data. For example, the radio bearer may he a Data Radio Bearer (DRB). Each radio bearer may be configured with a respective QCI by the network access device.

In step 204, the terminal may receive the QCI configured by the network access device for the radio bearer.

In step 205, the terminal may query the AC corresponding to the QCI based on the QOS class mapping table.

In step 206, the terminal may send second uplink data to the network access device using the AC via a WLAN link.

In step 207, the network access device may receive the second uplink data sent by the terminal via the WLAN link. The AC corresponding to the second uplink data may be obtained by the terminal through querying the QOS class mapping table according to the QCI. The first uplink data and the second uplink data may be data transmitted in aggregation transmission.

In the method for data transmission according to the embodiment, with the steps of the network access device configuring the QOS class mapping table and the QCI for the terminal, the terminal querying the AC corresponding to the QCI in the QOS class mapping table, the terminal sending the first uplink data to the network access device via a mobile communication link (e.g., an LTE link) based on the QCI, and the terminal sending the second uplink data to the network access device via a WLAN link based on the AC, the problem of how to guarantee the QOS in the uplink data transmission of the LWA can be solved. Accordingly, the terminal is enabled to perform uplink data transmission with same or similar QOS in the mobile communication link and the WLAN link, such that both the QOSs of these two links can be guaranteed.

Figure 3:
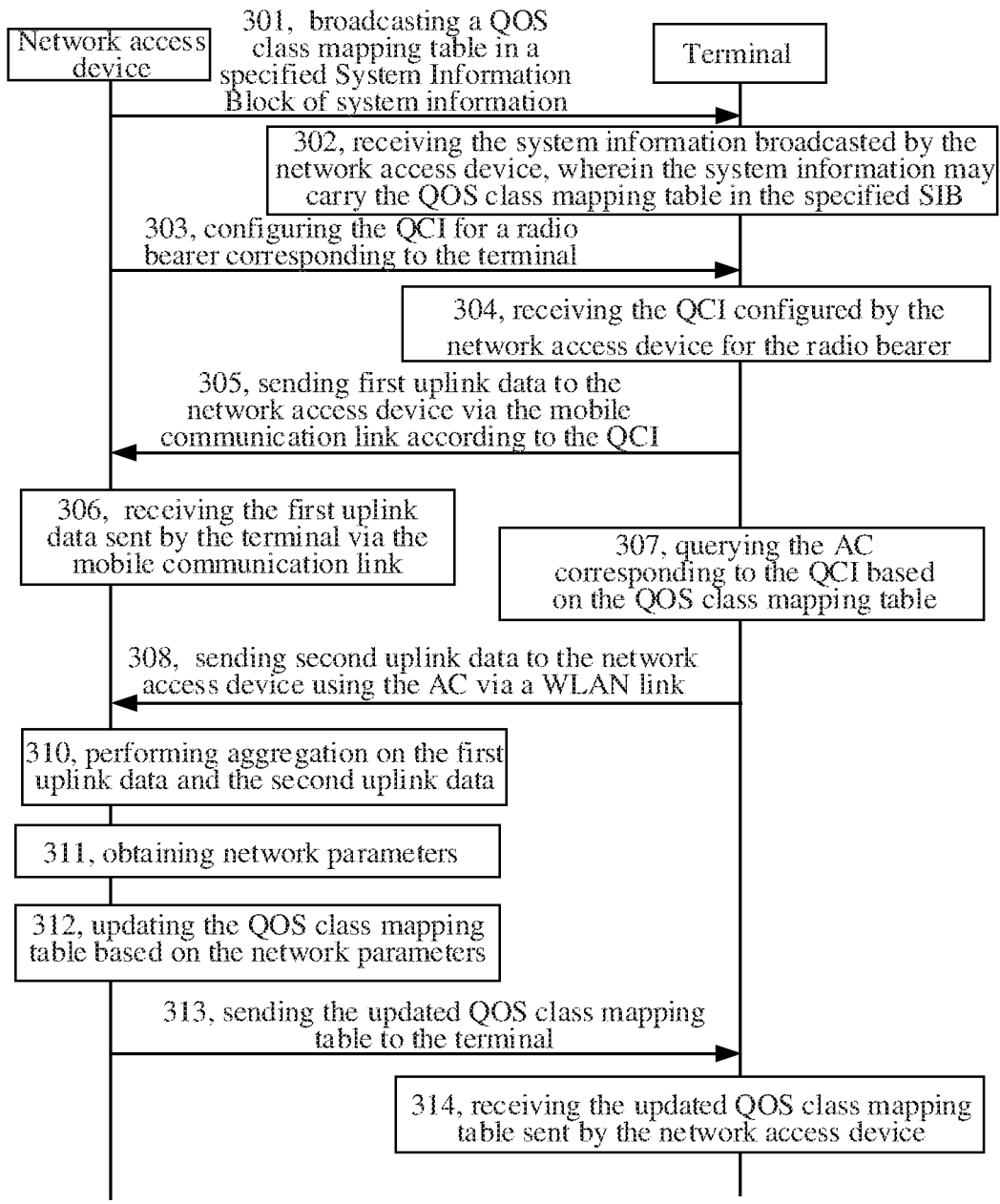
FIG. 3 is a flow diagram illustrating a method for data transmission according to an exemplary embodiment.

FIG. 3 is a flow diagram illustrating another method for data transmission according to an exemplary embodiment of the present disclosure. In this embodiment, the method for data transmission is illustrated by example as applied in the system for data transmission shown in FIG. 1. The method may include the following steps.

in step 301, a network access device may broadcast a QOS class mapping table in a specified System Information Block (SIB) of system information. The QOS class mapping table may include a corresponding relationship between a QCI and an AC.

The QCI may be a parameter representing the QOS class in a mobile communication system. In an LTE system, the network access device may configure the QCI for a radio bearer, and may allocate arid schedule transmission resources for the radio bearer according to the QCI. The radio bearer may be a logic channel for transmitting data corresponding to a service. In the LTE system, the value of the QCI may range from 1 to 9, and each value may correspond to a different resource type, a different priority level, a different time delay, and a different packet loss rate.

Table 1 illustrates a corresponding relationship between the value of the QCI, the priority level, the time delay, the packet loss probability, and an exemplary service, according to an exemplary embodiment.

TABLE 1

| QCI | priority level | time delay | packet loss rate | exemplary service |
|---|---|---|---|---|
| 1 | 2 | 100 ms | $10^{-2}$ | voice conversation |
| 2 | 4 | 150 ms | $10^{-3}$ | video conversation |
| 3 | 3 | 50 ms | $10^{-3}$ | real-time game |
| 4 | 5 | 300 ms | $10^{-5}$ | Non-conversational video |
| 5 | 1 | 100 ms | $10^{-5}$ | IMS signaling |
| 6 | 6 | 300 ms | $10^{-5}$ | TCP basic service |
| 7 | 7 | 100 ms | $10^{-3}$ | voice, video, interactive game |
| 8 | 8 | 300 ms | $10^{-5}$ | TCP basic service |
| 9 | 9 | 300 ms | $10^{-5}$ | TCP basic service |

The AC may be a parameter representing the QOS class in a WLAN system. In WLAN system, the AC may he allocated to each data packet on the Medium Access Control (MAC) layer, and the terminal, the WLAN AP, and the WT may allocate and schedule transmission resources according to each data packet's AC parameter. For example, the WLAN AP may allocate the data packets into four priority queues, the allocation depending on AC priority levels of these data packets. For example, the four priority queues may include AC-VO (Voice), AC-VI (Video), AC-BE (Best-effort), and AC-BK (Back-ground). The allocation is enabled to guarantee that the data packet in a higher priority queue may have a higher probability to occupy the channel.

In another exemplary embodiment, table 2 illustrates a QOS class mapping table.

TABLE 2

| QCI | AC |
|---|---|
| 1, 3, 5 | AC-VO |
| 2 | AC-VI |
| 6, 7 | AC-BE |
| 4, 8, 9 | AC-BK |

Because the value of the QCI may range from 1 to 9 and there are four types of AC, the network access device may establish a corresponding relationship in which one AC may correspond to two or more QCIs.

It should be noted that table 2 is only for the purpose of illustration, and in different embodiments, table 2 may have a different structure or content, which will not be limited in the present disclosure.

The network access device may broadcast the QOS class mapping table via system information. For example, the network access device may broadcast the QOS class mapping table t all terminals within its coverage area. Also for example, the network access device may broadcast the QOS class mapping table to one or more terminals that are within the coverage area.

The system information may include several System Information Blocks (SIBs). In the LTE system, the system information may include 18 SIBs. In one embodiment, the network access device may broadcast the QOS class mapping table in a specified SIB of system information. For example, the specified SIB may be an originally existing SIB (e.g. SIB 1) in the LTE system. In another example, the specified SIB may also be a newly added SIB (e.g. SIB 19) in the LTE system.

In one embodiment, the terminal may send second uplink data to the network access device via a WLAN link, and the AC information may be carried in a QOS control field of a MAC header of the second uplink data.

Table 3 illustrates the structure of an exemplary MAC frame according to an exemplary embodiment. The MAC frame may conform to the MAC format specified in Institute of Electrical and Electronics Engineers (IEEE) 802.11e.

TABLE 3

| Frame Control | Duration/ID | Address 1 | Address 2 | Address 3 | Sequence Control | Address 4 | QOS Control | Frame Body | FCS |
|---|---|---|---|---|---|---|---|---|---|

In step 302, the terminal may receive the system information broadcasted the network access device. The system information may carry the QOS class mapping table information in the specified SIB.

In step 303, the network access device may configure the QCI for a radio bearer corresponding to the terminal.

When the terminal is accessed in the LTE network, the terminal may establish a Radio Resource Control (RRC) connection with the network access device and may establish at least one radio bearer in the RRC connection. The radio hearer may be referred as an Evolved Packet System (EPS) bearer. The radio bearer may include a Signaling Radio Bearer (SRB) and a Data Radio Bearer (DRB). The SRB may be used for transmitting signaling and the DRB may be used for transmitting data.

The network access device may configure a corresponding QCI for each radio bearer. For example, the network access device may allocate a different QCI for each DRB according to each DRB's service type. For example, if the DRB is a bearer for transmitting voice conversation service, the network access device may allocate QCI=1 for the DRB.

In step 304, the terminal may receive the QCI configured by the network access device for the radio bearer.

In step 305, the terminal may send first uplink data to the network access device via the mobile communication link according to the QCI.

In one embodiment, the mobile communication k may be an LTE link. In another embodiment, the mobile communication link may he a transmission link in a 5G network. In different embodiments, the term "link" may be referred as a connection, a bearer, a channel, a tunnel and any other possible name. A person skilled in the art will understand that these nouns represent different ways for transmitting data in a mobile communication system, and should not limit the meaning of the term "link", In one embodiment, the network access device may allocate and schedule transmission resources for the radio hearer according to the QCI of the radio bearer. The terminal may send the first uplink data to the network access device according to the allocated or scheduled transmission resources.

In step 306, the network access device may receive the first uplink data sent by the terminal via the mobile communication link.

In step 307, the terminal may query the AC corresponding to the QCI based on the QOS class mapping table. For example, if the QCI of the radio bearer is 1, the AC obtained by the terminal according to the QOS class mapping table may he AC-VO.

In step 308, the terminal may send second uplink data to the network access device using the AC via a WLAN link.

In table 3, fields from Frame Control to QOS Control may form the MAC header of the 802.11e MAC frame, and the remaining fields may be the MAC body of the 802.11e MAC frame. The address 1 may be used for indicating the receiver of the data frame, the address 2 may be used for indicating the sender of the data frame, the address 3 may be used for indicating the destination address of the data frame, the address 4 may be used for indicating the source address of the data frame. The QOS control field may occupy 2 bytes, and may be used for carrying the AC.

For each data packet in the second uplink data, there exists the AC information in its MAC header, such that the WLAN AP and the WT may send the data packet with a corresponding QOS based on the AC.

In step 309, the network access device may receive the second uplink data sent by the terminal via the WLAN link.

In one embodiment, the WLAN network may use unauthorized spectrum resources. In one embodiment, the second uplink data may be sent from the terminal to the WLAN AP, then may be sent by the WLAN AP to the WT, then may be sent by the WT to the network access device. The network access device may receive the second uplink data forwarded by the WT.

In step 310, the network access device may perform aggregation on the first uplink data and the second uplink data.

In step 311, the network access device may obtain network parameters.

Since the network parameters may change over time, the network access device may obtain the network parameters in real time. The network parameters may represent a network quality condition between the network access device and the terminal. In one embodiment, the network parameters may represent the network quality condition of the mobile communication network. In one embodiment, the network parameters may represent the network quality condition of the WLAN link.

The network parameters may include, but are not limited to, at least one of a network congestion parameter, a data packet transmission rate, a data packet delay parameter, or a data packet loss parameter. The embodiments of the present disclosure do not limit the specific forms of the network parameters.

In step 312, the network access device may update the QOS class mapping table based on the network parameters.

In one embodiment, the network parameters may include the congestion parameter of the WLAN network. If the congestion parameter of the WLAN network is larger than a first threshold, the AC level corresponding to at least one QCI may be decreased appropriately, so as to ensure that the second uplink data of the terminal can be transmitted to the network access device in time for use in aggregation.

In another embodiment, the network parameters may include the data packet transmission rate of the WLAN network. If the data packet transmission rate of the WLAN network is larger than a second threshold, the AC level corresponding to at least one QCI may be increased appropriately, so as to ensure that the second uplink data of the terminal can be transmitted to the network access device in time for use in aggregation.

In yet another embodiment, the network parameters may include the data packet delay parameter and the data packet loss parameter. If the data packet delay parameter or the data packet loss parameter is larger than a third threshold, the AC level corresponding to at least one QCI may be increased appropriately.

The embodiments of the present disclosure do not limit the ways that the network access device updates the QOS class mapping table.

In step 313, the network access device may send the updated QOS class mapping table to the terminal.

In one embodiment, the network access device may broadcast the updated QOS class mapping table in a specified SIB of the system information. The specified SIB may be an originally existing SIB or a newly added SIB of the system information.

In step 314, the terminal may receive the updated QOS class mapping table sent by the network access device.

In one embodiment, the terminal may receive the system information broadcasted by the network access device, and the updated QOS class mapping table may be carried in the specified SIB of the system information.

In the method for data transmission provided by the embodiment, with the steps of the network access device configuring the QOS class mapping table and the QCI for the terminal, the terminal querying the AC corresponding to the QCI in the QOS class mapping table, the terminal sending the first uplink data to the network access device via a mobile communication link (e.g., an LTE link) based on the QCI, and the terminal sending the second uplink data to the network access device via a WLAN link based on the AC, the problem of how to guarantee the QOS in the uplink data transmission of the LWA can be solved. Accordingly, the terminal is enabled to perform uplink data transmission with same or similar QOS in the mobile communication link and the WLAN link, such that both the QOS of these two links can be guaranteed.

In the method for data transmission provided by the embodiment, with the steps of the network access device updating the QOS class mapping table based on the network parameters and sending the updated QOS class mapping table to the terminal, the QOS class mapping table can be updated dynamically to adapt to the varying real-time network condition, such that the QOS of the aggregation transmission of the uplink data can be guaranteed.

The following embodiments are devices that may be used to perform the methods disclosed in the above embodiments of the disclosure.

Figure 4:
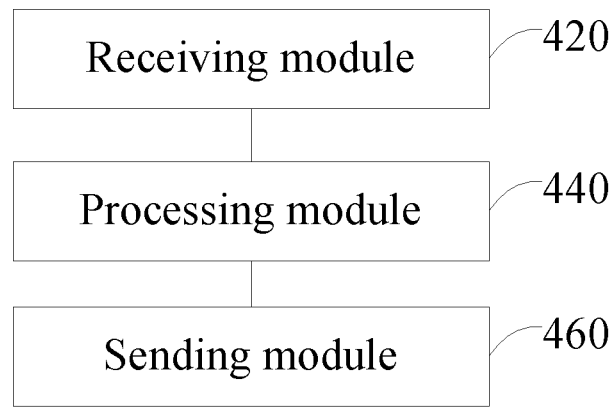
FIG. 4 is a block diagram illustrating an apparatus for data transmission according to an exemplary embodiment.

FIG. 4 is a block diagram illustrating an apparatus for data transmission according to an exemplary embodiment. The apparatus for data transmission may be implemented by dedicated hardware circuitry, or a combination of hardware and software, and may be embodied as all or part of the terminal in FIG. 1.

The apparatus for data transmission may include: a receiving module 420 configured to receive a Quality of Service (QOS) class mapping table sent from a network access device, the QOS class mapping table including a corresponding relationship between a Quality of service Class Identifier (QCI) and an Access Category (AC); the receiving module 420 further configured to receive the QCI configured by the network access device for a radio bearer, wherein the radio bearer is established between the terminal and the network access device and is configured to transmit first uplink data; a processing module 440 configured to query the AC corresponding to the QCI, based on the QOS class mapping table; and a sending module 460 configured to send second uplink data to the network access device using the AC via a Wireless Local Area Network (WLAN) link; wherein the first uplink data and the second uplink data are data transmitted in aggregation transmission. The aggregation transmission may refer to LWA aggregation transmission or eLWA aggregation transmission.

In one embodiment, the receiving module 420 may be further configured to receive system information broadcasted by the network access device, wherein the system information may carry the QOS class mapping table in a specified System Information Block (SIB), the specified SIB may be an originally existed SIB or a newly added SIB of the system information.

In one embodiment, the sending module 460 may be further configured to send the second uplink data to the network access device via the WLAN link, wherein the AC may be carried in a QOS control field of a Medium Access Control (MAC) header of the second uplink data.

In one embodiment, the receiving module 420 may be further configured to receive an updated QOS class mapping table from the network access device, wherein the updated QOS class mapping table is updated by the network access device based on network parameters; wherein the network parameters include at least one of a network congestion parameter, a data packet transmission rate, a data packet delay parameter, or a data packet loss parameter.

Figure 5:
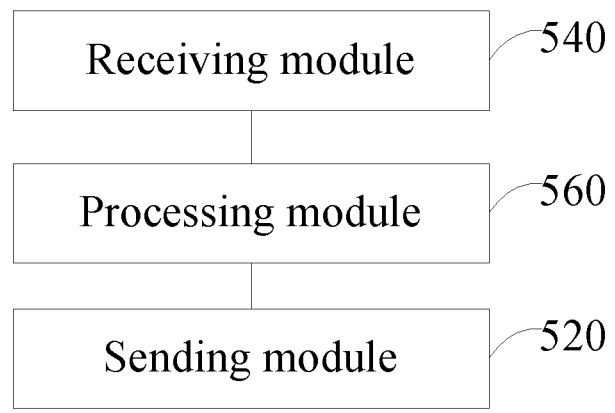
FIG. 5 is a block diagram illustrating an apparatus for data transmission according to an exemplary embodiment

FIG. 5 is a block diagram illustrating an apparatus for data transmission according to an exemplary embodiment. The apparatus for data transmission may be implemented by dedicated hardware circuitry, or a combination of hardware and software, and may be embodied as all or part of the network access device in FIG. 1.

The apparatus for data transmission may include: a sending module 520 configured to send a Quality of Service (QOS) class mapping table to a terminal, the QOS class mapping table including a corresponding relationship between a Quality of service Class Identifier (QCI) and an Access Category (AC); the sending module 520 further configured to configure the QCI for a radio bearer corresponding to the terminal, wherein the radio bearer is established between the terminal and the network access device and is configured to transmit first uplink data; and a receiving module 540 configured to receive second uplink data sent by the terminal via a Wireless Local Area Network (WLAN) link, wherein the AC corresponding to the second uplink data is the AC corresponding to the QCI in the QOS class mapping table; wherein the first uplink data and the second uplink data are data transmitted in aggregation transmission.

In one embodiment, the sending module 520 may be further configured to broadcast the QOS class mapping table in a specified System Information Block (SIB) of system information, wherein the specified SIB may be an originally existed SIB or a newly added. SIB of the system information.

In one embodiment, the apparatus for data transmission further includes: a processing module 560 configured to obtain network parameters, wherein the network parameters include at least one of a network congestion parameter, a data packet transmission rate, a data packet delay parameter, or a data packet loss parameter. The processing module 560 is further configured to update the QOS class mapping table based on the network parameters, and the sending module 520 is further configured to send the updated QOS class mapping table to the terminal.

Figure 6:
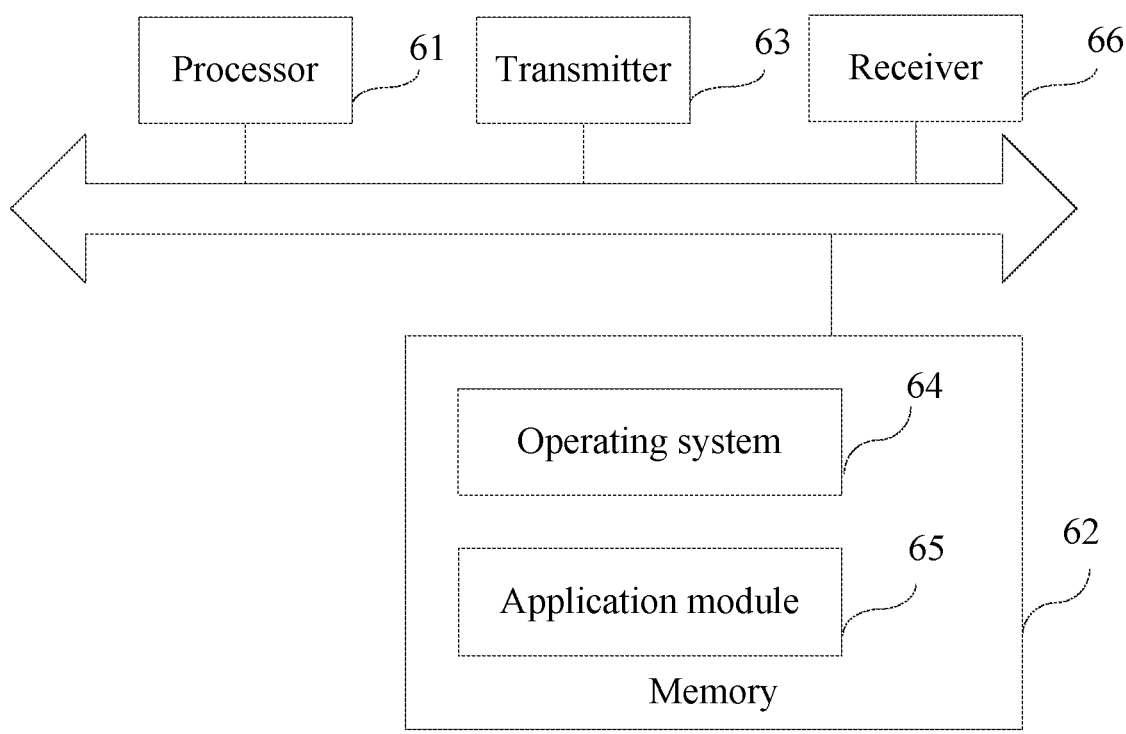
FIG. 6 is a block diagram illustrating a terminal according to an exemplary embodiment.

FIG. 6 is a block diagram illustrating the terminal 140 (FIG. 1) according to an exemplary embodiment. The terminal 140 may include a processor 61, a memory 62, a transmitter 63, and a receiver 66. The processor 61 may connect with the memory 62.

The processor 61 may include one or more processing cores, and the processor 61 may perform various functional applications and information processing by running software programs and units.

The memory 62 may store one or more program instructions. The one or more program instructions may be used to implement at least one software program and module. The memory 62 may store an operating system 64 and an application module 65 used for implementing at least one function. The processor 61 may be used for performing the program instructions stored in the memory 62 so as to implement the steps performed by the terminal 140 described above in the method embodiments.

The memory 62 may be implemented by any type of volatility or nonvolatile storage devices or combinations thereof, such as a SRAM, an EEPROM, an EPROM, a PROM, a ROM, a magnetic memory, a flash memory, a magnetic disk or an optical disc.

The transmitter 63 may include a modem unit and a Multiple Input Multiple Output (MIMO) antenna. The MIMO antenna may be an antenna supporting multiple antenna port to send and receive. In one embodiment, the MIMO antenna may include at least two transmitting antennas. In one embodiment, the transmitter 63 may implement data transmission and signaling transmission.

The receiver 66 may include a same or similar structure with the transmitter 63. In one embodiment, the receiver 66 may include a modem unit and a MIMO antenna, and the MIMO antenna may include at least two transmitting antennas.

A person skilled in the art will understand that the structure of the terminal 140 illustrated in FIG. 6 does not limit the terminal 140. The terminal 140 may include more or less components, or may combine some components, or may have different arrangement of the components.

Figure 7:
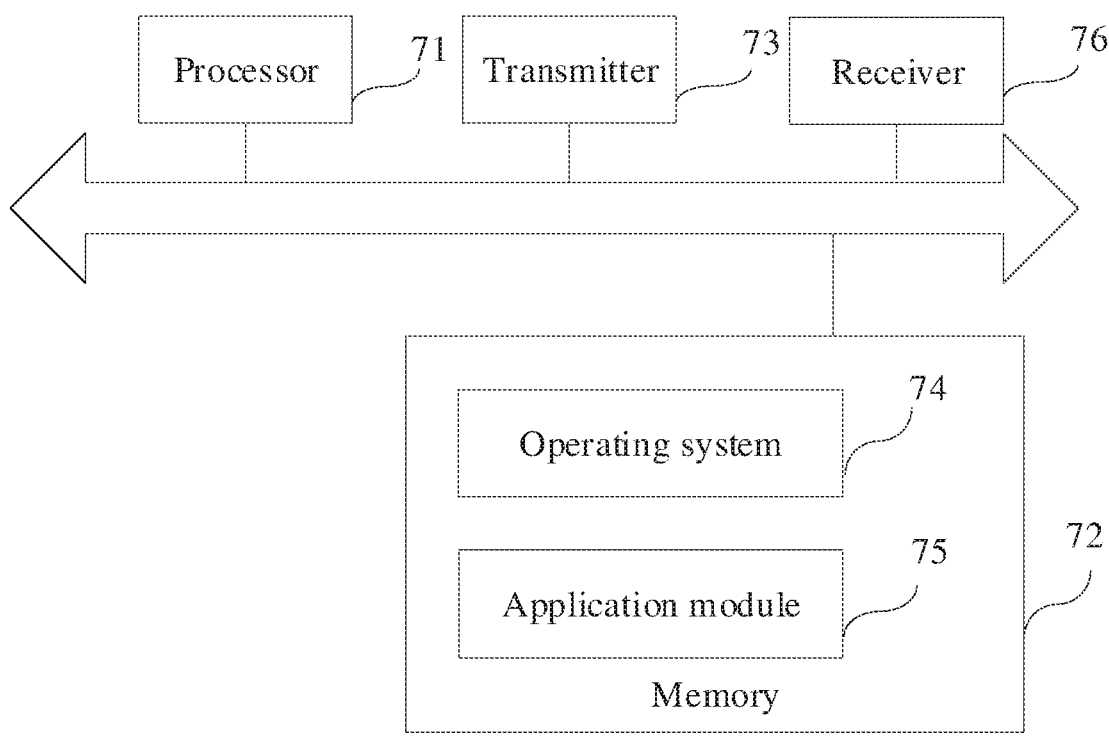
FIG. 7 is a block diagram illustrating a network access device according to an exemplary embodiment.

FIG. 7 is a block diagram illustrating the network access device 110 (FIG. 1) according to an exemplary embodiment. The network access device 110 may include a processor 71, a memory 72, a transmitter 73, and a receiver 76. The processor 71 may connect with the memory 72.

The processor 71 may include one or more processing cores, and the processor 71 may perform various functional applications and information processing by running software programs and units.

The memory 72 may store one or more program instructions. The one or more program instructions may be used to implement at least one software program and module. The memory 72 may store an operating system 74 and an application module 75 used for implementing at least one function. The processor 71 may be used for performing the program instructions stored in the memory 72 so as to implement the steps performed by the network access device 110 described above in the method embodiments.

Additionally, the memory 72 may be implemented by any type of volatility or nonvolatile storage devices or combinations thereof, such as a SRAM, an EEPROM, an EPROM, a PROM, a ROM, a magnetic memory, a flash memory, a magnetic disk or an optical disc.

The transmitter 73 may include a modem unit and a Multiple Input Multiple Output (MIMO) antenna. The MIMO antenna may be an antenna supporting multiple antenna port to send and receive. In one embodiment, the MIMO antenna may include at least two transmitting antennas. In one embodiment, the transmitter 73 may implement data transmission and signaling transmission.

The receiver 76 may include a same or similar structure with the transmitter 73. In one embodiment, the receiver 76 may include a modem unit and a MIMO antenna, and the MIMO antenna may include at least two transmitting antennas.

A person skilled in the art will understand that the structure of the network access device 110 illustrated in FIG. 7 does not limit the network access device 110. The network access device 110 may include more or less components, or may combine some components, or may have different arrangement of the components.

Figure 8:
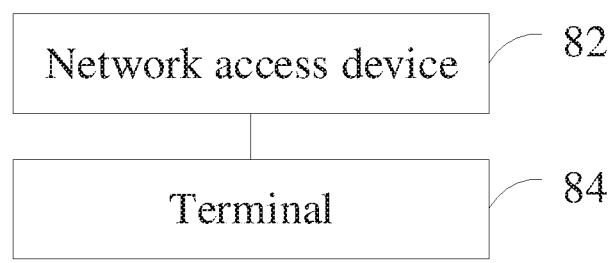
FIG. 8 is a block diagram illustrating a system for data transmission according to exemplary embodiment.

FIG. 8 is a block diagram illustrating a system for data transmission according to an exemplary embodiment. The system for data transmission may include: a network access device 82 and a terminal 84. For example, the network access device 82 may include the apparatus for data transmission shown by FIG. 5, and the terminal 84 may include the apparatus for data transmission shown by FIG. 4. Also for example, the network access device 82 may be the network access device shown by FIG. 7, and the terminal 84 may be the terminal shown by FIG. 6.

With respect to the device in the above embodiments, the specific manners for performing operations for individual modules therein have been described in detail in the embodiments regarding the method, which will not be repeated herein.

Other embodiments of the invention will be apparent to those skilled in the art from consideration of the specification and practice of the disclosures herein. This application is intended to cover any variations, uses, or adaptations of the disclosure following the general principles thereof and including such departures from the present disclosure as come within known or customary practice in the art. It is intended that the specification and embodiments be considered as illustrative only, with a true scope and spirit of the disclosure being indicated by the following claims.

It will be appreciated that the present disclosure is not limited to the exact construction that has been described above and illustrated in the accompanying drawings, and that various modifications and changes can he made without departing from the scope thereof. It is intended that the scope of the invention only be limited by the appended claims.

What is claimed is:

1. A method for data transmission, comprising:
receiving by a terminal a Quality of Service (QOS) class mapping table sent from a network access device, the QOS class mapping table comprising a corresponding relationship between a Quality of service Class Identifier (QCI) and an Access Category (AC);
receiving by the terminal the QCI configured by the network access device for a radio bearer, wherein the radio bearer is established between the terminal and the network access device and is configured to transmit first uplink data;

querying by the terminal the AC corresponding to the QCI, based on the QOS class mapping table;

sending by the terminal the first uplink data to the network access device; and sending by the terminal second uplink data to the network access device using the AC via a Wireless Local Area Network (WLAN) link, wherein the first uplink data and the second uplink data are data transmitted in aggregation transmission.

2. The method of claim 1, wherein the terminal receiving a Quality of Service (QOS) class mapping table sent from a network access device comprises:

receiving system information broadcasted by the network access device, wherein the system information carries the QOS class mapping table in a specified System Information Block (SIB), the specified SIB being an originally existing SIB or a newly added SIB of the system information.

3. The method of claim 2, further comprising:

receiving by the terminal an updated QOS class mapping table from the network access device, wherein the updated QOS class mapping table is updated by the network access device based on network parameters, wherein the network parameters comprise at least one of a network congestion parameter, a data packet transmission rate, a data packet delay parameter, or a data packet loss parameter.

4. The method of claim 1, wherein the terminal sending second uplink data to the network access device using the AC via a Wireless Local Area Network (WLAN) link comprises:

sending the second uplink data to the network access device via the WLAN link, wherein the AC is carried in a QOS control field of a Medium Access Control (MAC) header of the second uplink data.

5. The method of claim 1, further comprising:

receiving by the terminal an updated QOS class mapping table from the network access device, wherein the updated QOS class mapping table is updated by the network access device based on network parameters, wherein the network parameters comprise at least one of a network congestion parameter, a data packet transmission rate, a data packet delay parameter, or a data packet loss parameter.

6. A method for data transmission, comprising:

sending by a network access device a Quality of Service (QOS) class mapping table to a terminal, the QOS class mapping table comprising a corresponding relationship between a Quality of service Class Identifier (QCI) and an Access Category (AC);

configuring by the network access device the QCI for a radio bearer corresponding to the terminal, wherein the radio bearer is established between the terminal and the network access device and is configured to transmit first uplink data; and receiving by the network access device second uplink data sent by the terminal via a Wireless Local Area Network (WLAN) link, wherein the AC corresponding to the second uplink data is the AC corresponding to the QCI in the QOS class mapping table, wherein the first uplink data and the second uplink data are data transmitted in aggregation transmission.

7. The method of claim 6, wherein the network access device sending a Quality of Service (QOS) class mapping table to a terminal comprises:

broadcasting the QOS class mapping table in a specified System Information Block (SIB) of system information, wherein the specified SIB is an originally existing SIB or a newly added SIB of the system information.

8. The method of claim 7, further comprising:

obtaining by the network access device network parameters, wherein the network parameters comprise at least one of a network congestion parameter, a data packet transmission rate, a data packet delay parameter, or a data packet loss parameter;

updating by the network access device the QOS class mapping table based on the network parameters; and sending by the network access device the updated QOS class mapping table to the terminal.

9. The method of claim 6, further comprising:

obtaining by the network access device network parameters, wherein the network parameters comprise at least one of a network congestion parameter, a data packet transmission rate, a data packet delay parameter, or a data packet loss parameter;

updating by the network access device the QOS class mapping table based on the network parameters; and sending by the network access device the updated QOS class mapping table to the terminal.

10. An apparatus for data transmission, comprising:

a receiver configured to receive a Quality of Service (QOS) class mapping table sent from a network access device, the QOS class mapping table comprising a corresponding relationship between a Quality of service Class Identifier (QCI) and an Access Category (AC), wherein the receiver is further configured to receive the QCI configured by the network access device for a radio bearer, wherein the radio bearer is established between the terminal and the network access device and is configured to transmit first uplink data;

a processor configured to query the AC corresponding to the QCI, based on the QOS class mapping table; and a transmitter configured to send the first uplink data to the network access device, and send second uplink data to the network access device using the AC via a Wireless Local Area Network (WLAN) link, wherein the first uplink data and the second uplink data are data transmitted in aggregation transmission.

11. The apparatus of claim 10, wherein the receiver is further configured to receive system information broadcasted by the network access device, wherein the system information carries the QOS class mapping table in a specified System Information Block (SIB), the specified SIB is an originally existing SIB or a newly added SIB of the system information.

12. The apparatus of claim 10, wherein the transmitter is further configured to send the second uplink data to the network access device via the WLAN link, wherein the AC is carried in a QOS control field of a Medium Access Control (MAC) header of the second uplink data.

13. The apparatus of claim 10, wherein the receiver is further configured to receive an updated QOS class mapping table from the network access device, wherein the updated QOS class mapping table is updated by the network access device based on network parameters, wherein the network parameters comprise at least one of a network congestion parameter, a data packet transmission rate, a data packet delay parameter, or a data packet loss parameter.

14. An apparatus for data transmission, comprising:

a transmitter configured to send a Quality of Service (QOS) class mapping table to a terminal, the QOS class mapping table comprising a corresponding relationship between a Quality of service Class Identifier (QCI) and an Access Category (AC), wherein the transmitter is further configured to configure the QCI for a radio bearer corresponding to the terminal, and the radio bearer is established between the terminal and the network access device and is configured to transmit first uplink data; and a receiver configured to receive second uplink data sent by the terminal via a Wireless Local Area Network (WLAN) link, wherein the AC corresponding to the second uplink data is the AC corresponding to the QCI in the QOS class mapping table, wherein the first uplink data and the second uplink data are data transmitted in aggregation transmission.

15. The apparatus of claim 14, wherein the transmitter is further configured to broadcast the QOS class mapping table in a specified System Information Block (SIB) of system information, wherein the specified SIB is an originally existing SIB or a newly added SIB of the system information.

16. The apparatus of claim 14, further comprising:

a processor configured to obtain network parameters, wherein the network parameters comprise at least one of a network congestion parameter, a data packet transmission rate, a data packet delay parameter, or a data packet loss parameter, the processor is further configured to update the QOS class mapping table based on the network parameters, and the transmitter is further configured to send the updated QOS class mapping table to the terminal.

17. A terminal, comprising:

a processor; and a memory storing instructions executable by the processor, wherein the processor is configured to perform the method of claim 1 by executing the instructions.

18. A network access device, comprising:

a processor; and a memory storing instructions executable by the processor, wherein the processor is configured to perform the method of claim 6 by executing the instructions.

* * * * *